Figure 1:
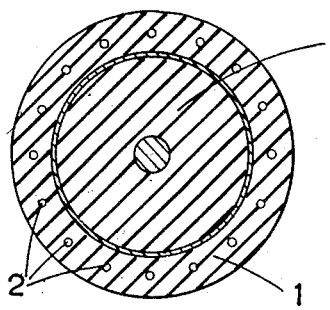

Dec. 24, 1963  G. PALANDRI ET AL  3,115,542
SUBMARINE ELECTRIC CABLES
Filed May 2, 1961

DIAGRAM OF THE LOAD AS A FUNCTION
OF THE ELONGATION PERCENTAGE

INVENTORS:
GIUSEPPE PALANDRI
PAOLO GAZZANA PRIAROGGIA
by Eugene E. Stevens and/or
Raymond H. Stevens
ATTORNEYS United States Patent Office 3,115,542
Patented Dec. 24, 1963

3,115,542
SUBMARINE ELECTRIC CABLES
Giuseppe Palandri and Paolo Gazzana Priaroggia, both of Milan, Italy, assignors to Pirelli Societa per Azioni, Milan, Italy
Filed May 2, 1961, Ser. No. 107,221
3 Claims. (Cl. 174—102)

This invention relates to submarine electric cables and has particular reference to the armouring of submarine cables of the type intended to be laid in deep waters or oceans. The present application is a continuation-in-part of our copending application Serial No. 752,283, filed July 31, 1958, now abandoned.

Heretofore submarine cables of the deep-sea type have been provided with an armour for withstanding the stresses, which are frequently very high, that occur both during the laying operations and also the recovering operations, which latter involve the pulling-in of the cable.

As is well known, long deep-sea submarine cables, both of the telegraph and telephone types, usually comprise one or more copper conductors insulated with a covering of a natural or synthetic thermoplastic material having suitable chemical and physical characteristics. The conductor insulated in this manner, or the conductors thus insulated and then stranded together, if desired with the addition of fillings of tanned jute, constitute the so-called "cable core," which is then provided with a serving consisting of helically wound yarns made of tanned jute, over which there is then applied a protective metallic armouring consisting of a layer of galvanised steel wires which, to ensure the desired flexibility of the cable and in order to hold the wires together, must be wound helically over the cable core. Finally there is applied over the armouring a covering of tarred or bitumenized jute yarn or tape.

When the layer of steel wires helically wound over the cable core is subjected to tensile stresses along the axis of the cable, it gives rise to a torque which causes the rotation about the said axis of all those transverse sections of the cable which are not linked.

During the laying of a cable in deep waters, when there is a considerable length of cable linked, practically speaking, only to the paying-off or laying drum on board the ship, hundreds or even thousands of complete revolutions may occur which, owing to the effect of temporary and unavoidable decreases of the stress in the longitudinal direction, easily give rise to loops or knots which frequently produce permanent detrimental effects on the electrical or mechanical characteristics of the cable. This necessitates carrying out all the requisite marine operations with particular care, but this however is not always sufficient to give the desired results.

In order to eliminate the above-mentioned torque, it is possible to employ an armouring consisting of two separate layers of wires, one superimposed over the other and stranded in opposite directions with stranding pitches which are suitably chosen in such manner as to balance the torsional stresses, so that the resulting stresses are practically nil or negligible. This solution of the problem is, however, uneconomic, because the double armouring is more expensive than the single one and has consequently been adapted, for purposes of mechanical protection, only for those lengths of cable which are laid close to coasts.

A different solution, described in the prior British Patents Nos. 703,782 and 740,647, has recently been devised for the special case of submarine cables of the coaxial type in order to reduce substantially the tendency of the cables to twist under axial tension. In the case of the prior constructions of cable just referred to the armouring element, which provides the required high tensile strength, is not located externally to the cable core but is axially disposed within the central hollow conductor of the coaxial pair of conductors, such element comprising a steel strand designed to be torsionally balanced. This type of armouring however involves a very complicated construction of the cable, which has disadvantages of a mechanical nature due to the inaccessibility of the supporting armouring element, whilst the electrical characteristics of the cable are liable to suffer irregularities owing to the fact that both of the conductors are subjected to considerable stresses.

The present invention has for its object to provide a completely new and general solution of the problem by the employment of an armouring for submarine electric cables which does not give rise to any torsional stresses when the cable is subjected to tension, and which at the same time ensures an effective mechanical protection for the core of the cable, in whatever manner such core may be constructed.

There has previously been proposed a submarine cable in which the conducting wires were insulated with gutta percha or rubber, while the insulated conductors were covered with simple straight solid steel wires arranged parallel to the axis of the cable, the steel wires being finally covered with an insulation. Such a cable, although producing the desired antitorsional effect when subjected to flexion stresses and at the same time to tensile stresses such as are encountered in normal laying and recovery operations, offers a limited mechanical resistance and for this reason has never had a practical application. It is known that the highest tension stresses take place during the laying and the recovering of submarine cables and that in this operation the cable must necessarily pass over the pulley situated on the prow of the cable-laying ship, thus being subjected to flexion If the section of the armour reacts in a homogeneous way to this flexion stress, the neutral axis remains barycentric and the wires of the stretched portion of the armour lying furthest from the centre of the pulley must elongate proportionally to the ratio between the diameter of the cable armour and the diameter of the pulley, said ratio being in practice about 1:100. The wires of the compressed portion of the armour, being closest to the centre of the pulley, are shortened in the same proportion. Therefore, in the most stressed wires, the tensile stress due to the flexion only is that corresponding to an elongation of 1:100, so there is no margin for the further tensile stresses exerted on the cable by the often considerable length of linked cable already submerged. Thus the use of armour composed of simple straight steel wires as heretofore proposed inevitably results in practical failures as outlined above.

Figure 4:
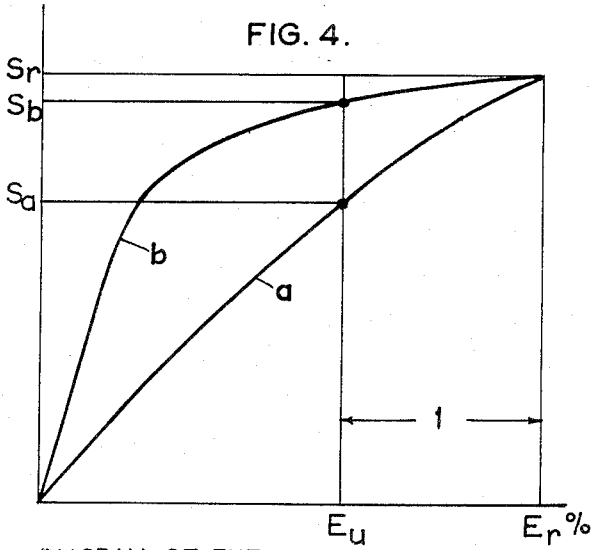

Quite analogous considerations are applicable when the steel wires are substituted by what may be termed generic steel strands, namely by strands which do not possess particular characteristics. In fact, when the flexion stress takes place when the cable is already subjected to a considerable tension load, it is evident that this elongation must be subtracted from that corresponding to the breaking load and therefore there is a considerable reduction in the useful load. FIGURE 4 of the accompanying drawings illustrates the load S-elongation percentage E diagram for a generic strand (curve $a$). From this diagram it is evident that by subtracting from the elongation $E_r$ at the breaking load the elongation of 1% due to flexion only, there is obtained the elongation $E_u$ utilizable for the simple tension, to which there corresponds a load $S_a$ markedly smaller than the breaking load $S_r$. This is the reason why all the cables provided with longitudinal armouring heretofore known have found only a limited application, even if the armourings were constituted by steel strands.

For the purpose of the present invention a submarine electric cable comprises a cable core, a sheath of thermoplastic material, for example polyethylene, which surrounds and protects the said core, and an armouring consisting not of simple straight steel wires but of a plurality of steel strands, each of which strands is formed of several elementary strands comprising several wires of high strength stranded together with suitably small laying pitches, such strands being circumferentially arranged and disposed parallel to one another and to the axis of the cable and being wholly embedded in the thermoplastic sheath so that they are maintained in a prefixed position therein, and said strands being chosen from those having a highly non-linear load-elongation diagram, especially in the zone near the breaking load so that the cable armouring has a breaking load for combined flexion and tension which is substantially equal to the breaking load for simple tension. Thus, according to the present invention, armouring strands are in fact used which are carefully chosen in order to exhibit a load-elongation diagram in accordance with curve $b$ of FIGURE 4, namely a diagram which is highly non-linear, particularly in the zone near the breaking load, so that considerable elongation differences exist in this zone. From curve $b$ it follows that, if $S_r$ and $E_r$ (breaking load and elongation at the breaking load) are respectively the same as in the case of curve $a$, the utilizable load $S_b$, corresponding to the utilizable elongation $E_u$, is in this case only somewhat smaller than the breaking load $S_r$. In this way a cable is obtained which is provided with an armouring having a breaking load for combined flexion and tension substantially equal to the breaking load for simple tension, this being different from what happens in the hitherto known cables provided with armourings constituted by strands or wires longitudinally disposed.

It is to be remarked that the novel feature of the present invention does not consist simply in strands having a particular load-elongation diagram of type $b$ as shown in FIGURE 4, since such strands are already known per se and can be obtained by stranding together suitable steel wires of high tensile strength with appropriately small laying pitches. On the contrary, the novelty of the invention lies in having found that strands having a load-elongation diagram of type $b$ provide the solution of the problem of constructing antitorsional submarine cable armourings formed of longitudinal strands which very well withstand the simultaneous flexion and tension stresses to which such cables are subjected, and in the utilization of said strands for such construction, thus leading to a remarkable technical advance.

By way of example, steel strands according to the present invention which are embedded in the thermoplastic, such as polyethylene, sheath of the cable and arranged parallel to one another and to the axis of the cable in the manner hereinbefore described can be produced in the following manner. Each strand is formed of seven elementary strands, each of which latter comprises three steel wires 0.25 mm. in diameter, six of the elementary strands being wound around a central or core elementary strand. The wires of each elementary strand are stranded at a pitch of from 4 to 6 mms. and the elementary strands are stranded at a pitch of from 10 to 20 mms.

As will be seen from the example given above, the armouring strands used in the antitorsional cable sheath according to the present invention are formed of several elementary strands, and the ratio between the stranding pitch of the elementary strands and their diameter, as well as the ratio between the stranding pitch of the wires constituting the elementary strands and the diameter of said wires, should be lower than 30. By means of such construction of the armouring not only is any torsional reaction of the armouring, when the cable is subjected to tension, eliminated, but in addition the tensile stress to which the cable is subjected during laying and recovery operations is considerably reduced as hereinafter indicated. Further, the armouring can be formed with a small number of elementary metallic strands, because it is no longer necessary, as in the case of conventional armourings, for the strands to be in contact with one another, since the thermoplastic sheath constitutes the means for holding them in position.

From the example of construction of the armouring mentioned above it clearly appears that in the conditions of flexion only, which practically occur during the laying or the recovery of submarine cables, whereas cables having an antitorsional armour composed of simple straight steel wires or strands with unstated characteristics are liable to break or to lose the most part of their resistance to tension, cables according to the present invention maintain in the same conditions of stress more than 70% of their ultimate tensile stress.

Figure 3:
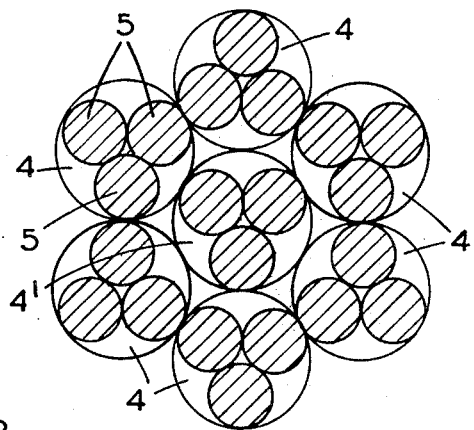
Figure 2:
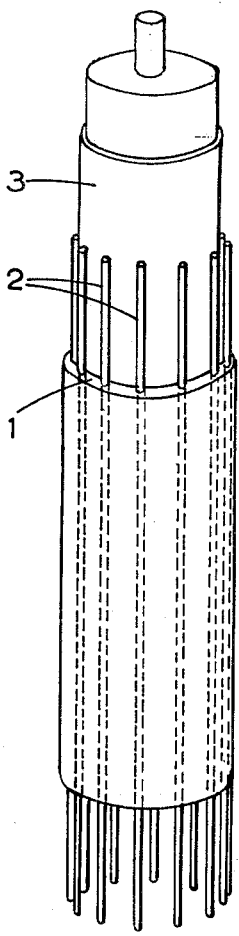

In order that the invention may be clearly understood and readily carried into effect, it will now be described more fully by way of example with reference to the accomapnying diagrammatic drawings in which:

FIGURE 1 is a cross-section of a submarine coaxial cable provided with an antitorsional armoured sheath according to the invention, FIGURE 2 illustrates in side elevation the armoured cable shown in FIGURE 1, FIGURE 3 is a cross-sectional view illustrating the construction, previously described by way of example, of the steel strands, and FIGURE 4 is the diagram previously referred to illustrating the load as a function of the elongation percentage of the armouring strands.

Referring to FIGURES 1 and 2 of the drawings, 1 is the sheath of a submarine coaxial cable, made of any suitable thermoplastic material, such as polyethylene, which has wholly incorporated in its thickness steel strands 2 (indicated diagrammatically in these figures but constructed for instance in the manner shown in FIGURE 3), each of which strands comprises a plurality of wires stranded or twisted together so as to have the characteristics previously mentioned. These strands 2 are arranged parallel to the axis of the cable and are laterally spaced at approximately equal distances from one another. The sheath 1 protects the cable coaxial core 3 externally, but the cable core 3 can be of any type, for instance, a telegraph cable, or a cable comprising one or more pairs or quads.

As shown in FIGURE 3, each of the strands 2 is constituted by seven elementary strands, each of which latter comprises three steel wires 5, six of the elementary strands 4 being wound around a central or core elementary strand $4^1$, so that the strands 2 constructed in this manner possess the characteristics shown by curve $b$ of FIGURE 4.

The antitorsional armoured sheath described above permits of obtaining two different results at the same time, these being as follows:

(1) Obtaining an armouring which does not of itself give rise to torsional stresses, and (2) Obtaining an armouring which, by means of the use of materials of high strength, makes possible, for an equal ultimate tensile breaking stress a considerable reduction in the weight of the cable itself and a considerable reduction in the tensile stresses, to which the cable is subjected during laying and recovery operations.

In addition to the substantial advantages above mentioned, further advantages provided by the new constructions of submarine cable according to the present invention are as follows:

(a) The possibility of eliminating any kind of serving between the core of the cable and the armour, because the function of a serving is taken over by the same sheath which incorporates the metal strands, (b) The possibility of eliminating all protective coatings for the metal strands of the armouring, because these strands are not in direct contact with the sea water, but are surrounded and protected by the thermoplastic sheath itself.

The above-mentioned advantages lead to considerable simplicity of construction and lower manufacturing costs of the improved submarine cables according to the invention.

What we claim and desire to secure by Letters Patent of the United States is:

1. A submarine electric cable provided with an antitorsional armoured sheath which does not cause twisting when it is subjected to tensile stresses along its axis, said cable comprising a cable core, a sheath of thermoplastic material which surrounds and protects the said core, and an armouring consisting of a plurality of steel strands each of which strands is formed of several elementary steel strands comprising several wires of high strength stranded together, such steel strands being circumferentially arranged and disposed parallel to one another and to the axis of the cable and being wholly embedded in the thermoplastic sheath so that they are maintained in a prefixed position therein, the ratio between the stranding pitch of the elementary strands and their diameter, and between the stranding pitch of the wires and their diameter, being less than thirty.

2. A submarine electric cable as in claim 1, in which all of the adjacent steel armouring strands are laterally spaced from one another.

3. A submarine electric cable as in claim 1, in which the thermoplastic material surrounding the core of he cable is composed of polyethylene and all of the adjacent steel armouring strands are laterally spaced from one another.

References Cited in the file of this patent

UNITED STATES PATENTS 2,576,227     Hutchins _____ Nov. 27, 1951

FOREIGN PATENTS 2,402     Great Britain _____ of 1859
279,684     Great Britain _____ Nov. 3, 1927

OTHER REFERENCES

Lessells: Strength and Resistance of Metals, John Wiley & Sons, 1954, pp. 4–6, TA 460 L 46.